(12) United States Patent
Koide et al.

(10) Patent No.: US 7,848,943 B2
(45) Date of Patent: Dec. 7, 2010

(54) SYSTEM AND METHOD FOR SUPPORTING PURCHASE OR PRODUCTION OF PRODUCTS BY POTENTIAL DEMAND PREDICTION

(75) Inventors: Akio Koide, Yokohama (JP); Kaori Fujiwara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 11/608,145

(22) Filed: Dec. 7, 2006

(65) Prior Publication Data

US 2007/0150328 A1    Jun. 28, 2007

(30) Foreign Application Priority Data

Dec. 22, 2005    (JP) .............................. 2005-369291

(51) Int. Cl.
*G05B 19/418* (2006.01)
(52) U.S. Cl. ......................................................... 705/8
(58) Field of Classification Search ........................ None
See application file for complete search history.

(56) References Cited

U.S. PATENT DOCUMENTS 7,313,532 B2 * 12/2007 Mariamova et al. ............. 705/7
7,680,685 B2 * 3/2010 Ouimet et al. .................. 705/10

FOREIGN PATENT DOCUMENTS

| JP | 05-314094 | 11/1993 |
|---|---|---|
| JP | 08-055161 | 2/1996 |
| JP | 08-279013 | 10/1996 |

(Continued)

OTHER PUBLICATIONS

Draganska, M. et al.; A Likelihood Approach to Estimating Market Equilibrium Models; Apr. 2002; Informs; Management Science, vol. 50, No. 5; pp. 605-616.*

(Continued)

*Primary Examiner*—Susanna M Diaz
*Assistant Examiner*—Ashley Y Chou
(74) *Attorney, Agent, or Firm*—Yee & Associates, P.C.; Mark E. McBurney

(57) ABSTRACT

To support a purchase or a production of a product by accurately predicting a sold amount of the product. A system that supports a purchase or a production of a product, the system including an input section for accepting an input of a history of a supplied amount and a sold amount of the products, a function generating section for representing a conditional probability function showing probability distribution of a sold amount when the sold amount is restricted by the supplied amount by means of a potential demand probability function including a parameter showing probability distribution of the sold amount when it is supposed that the sold amount is not restricted by the supplied amount and computing a value of the parameter maximizing a value of a likelihood function of the conditional probability function using the input history as a sample to generate the potential demand probability function, and a supplied amount computing section for computing a supplied amount of the product maximizing a profit by a sale of the product, based on the generated potential demand probability function and a predetermined selling price and supplying price of the product, and outputting the amount as a quantity of the product to be purchased or produced.

9 Claims, 10 Drawing Sheets

FOREIGN PATENT DOCUMENTS

| JP | 09-073491 | | 3/1997 |
|---|---|---|---|
| JP | 10-048008 | | 2/1998 |
| JP | 2000048262 A | * | 2/2000 |
| JP | 2002-149780 | | 5/2002 |
| JP | 2003-256524 | | 9/2003 |
| JP | 2003-256635 | | 9/2003 |
| JP | 2004-062693 | | 2/2004 |
| JP | 2004-118429 | | 4/2004 |
| JP | 2004-287759 | | 10/2004 |

OTHER PUBLICATIONS

Bu, R. et al.; Maximum Likelihood Estimation of Higher-Order Integer-Valued Autoregressive Processes; Jun. 2006; Blackwell Publishing Ltd.; Journal of Time Series Analysis, vol. 29, No. 6.*

Divakar, S. et al.; A Multichannel, Multiregion Sales Forecasting Model and Decision Support System for Consumer Packaged Goods; Jul. 21, 2004; Informs; Marketing Science, vol. 24, No. 3; pp. 334-350.*

Gaur, V. et al.; Estimating Demand Uncertainty Using Judgmental Forecasts; Apr. 18, 2005; Informs; M&SOM, vol. 9, No. 4; pp. 480-491.*

Saji Nobuo: "Operations research theory and practice", baifu-kan, pp. 170-172, 1963.

Yoshihiro Higashihara, Atsushi Saito, "Optimal order quantity of a rice ball in a convenience store", http://www.seto.nanzan-u.ac.jp/msie/gr-thesis/ms/2003/sawaki/sawaki.html.

Statistics education board: A problem of a news vendor, pp. 182-183. retrieved Nov. 1, 2006. http://stat.sci.kagoshima-u.ac.jp/~cse/contents/orency/doc/p182.html.

S.L.S. Jacoby, J.S. Kowalik, J.T. Pizzo "Interative Methods for Non-linear Optimization Problems", Prentice-Hall, Inc., 1972, pp. 130-131.

Magnus Hestenes, "Conjugate Direction Methods in Optimization", Springer-Verlag, 1980, pp. 232-241.

* cited by examiner

20

200-1

| PERIOD | SUPPLIED AMOUNT | SOLD AMOUNT | SELLING PRICE |
|---|---|---|---|
| MAY/1/2005 | 2050 | 1890 | 1020 |
| MAY/2/2005 | 2300 | 2120 | 850 |
| MAY/3/2005 | 2600 | 2600 | 750 |
| MAY/4/2005 | 2800 | 2800 | 750 |
| MAY/5/2005 | 2170 | 1250 | 900 |
| MAY/5/2005 | 2310 | 1310 | 850 |
| ⋮ | ⋮ | ⋮ | ⋮ |

| DATA COUNT | REPEAT COUNT | AVERAGE | DISPERSE/AVERAGE |
|---|---|---|---|
| 32 | 5 | 63.206653 | 2.387745 |
| 64 | 5 | 61.692336 | 2.242714 |
| 128 | 6 | 64.229014 | 2.737110 |
| 256 | 6 | 64.480849 | 2.811524 |
| 521 | 6 | 61.257117 | 3.043116 |

FIG. 5

| FORWARD STOCK | REPEAT COUNT | AVERAGE | DISPERSE/AVERAGE |
|---|---|---|---|
| 60 | 6 | 65.014793 | 3.020121 |
| 70 | 5 | 64.337024 | 2.777365 |
| 80 | 4 | 64.207391 | 2.724753 |
| 90 | 4 | 64.524117 | 2.929501 |
| 100 | 3 | 64.416087 | 2.844045 |

FIG. 6

SYSTEM AND METHOD FOR SUPPORTING PURCHASE OR PRODUCTION OF PRODUCTS BY POTENTIAL DEMAND PREDICTION

BACKGROUND OF THE INVENTION

1. Field of the Invention

The present invention relates to a system that supports a purchase or a production of a product, and particularly relates to a system that supports a purchase or a production of a product based on a history of a sold amount and a history of a supplied amount of the product.

2. Description of the Related Art

In recent years, in a type of business such as eating and drinking places or restaurants, retail businesses, and distribution industries, items of products for sale has been increasing with diversification of demands. In such types of businesses, when an amount of purchase or an amount of production is determined based on experience and perception of a person in charge, it is concerned that dead stock or sold out may occur and thus it causes the loss and the decrease of profit. Therefore, it is desirable that a computer system predicts a future amount of sale based on, for example, actual data of a past sold amount and determines an appropriate amount of purchase or amount of production.

For example, if the probability distribution of a sold amount can be obtained as a prediction of a future sold amount, it will be possible to determine an amount of purchase by solving a problem conventionally known, i.e., maximization of an expected profit (refer to Non-Patent Documents 1 to 3). In fact, there has been conventionally provided a proposal of a system in which an amount of purchase or an amount of production may be computed based on a prediction of a future sold amount (refer to Patent Documents 1 to 7).

[Non-Patent Document 1]
Nobuo Saji: "Operations research theory and practice", baifu-kan, pp 170-172, 1963

[Non-Patent Document 2]
Fumihiro Higashihara, Atsushi Saito: Optimal order amount of rice-balls in a convenience store, http://www.seto.nanzan-u.ac.jp/msie/gr-thesis/ms/2003/sawaki/sawaki.html

[Non-Patent Document 3]
Special Committee of Statistical Education: Problem of a news vendor, http://stat.sci.kagoshima-u.ac.jp/~cse/contents/orency/doc/p182.html

[Non-Patent Document 4]
S. L. S. Jacoby, J. S. Kowalik, J. T. Pizzo: "Interative Methods for Nonlinear Optimization Problems", Prentice-Hall, Inc., 1972

[Non-Patent Document 5]
Magnus Hestenes: "Comjugate Direction Methods in Optimization", Springer-Verlag, 1980

[Patent Document 1]
Japanese Unexamined Patent Publication No. Heisei 8-55161

[Patent Document 2]
Japanese Unexamined Patent Publication No. Heisei 10-48008

[Patent Document 3]
Japanese Unexamined Patent Publication No. 2002-149780

[Patent Document 4]
Japanese Unexamined Patent Publication No. 2003-256524

[Patent Document 5]
Japanese Unexamined Patent Publication No. 2004-287759

[Patent Document 6]
Japanese Unexamined Patent Publication No. Heisei 9-73491

[Patent Document 7]
Japanese Unexamined Patent Publication No. 2003-256635

[Patent Document 8]
Japanese Unexamined Patent Publication No. 2004-62693

[Patent Document 9]
Japanese Unexamined Patent Publication No. 2004-1184429

[Patent Document 10]
Japanese Unexamined Patent Publication No. Heisei 5-314094

[Patent Document 11]
Japanese Unexamined Patent Publication No. 8-279013

According to the techniques described in Patent Documents 1 to 5, a predicted value of a sold amount is computed as a constant. Therefore, a profit becomes large if the predicted value is equal to an actual sold amount, whereas a profit becomes extremely small if the predicted value is different from an actual sold amount. That is, it can be considered that in comparison with the technique for computing a predicted value of a sold amount as probability distribution, the accuracy of prediction declines, causing a decrease in an expected profit. Meanwhile, according to the techniques described in Patent Documents 6 and 7, a predicted value of a sold amount is computed as probability distribution. However, these documents do not describe how to compute a predicted value of a sold amount based on actual data on past sold amounts. Therefore, even in these techniques, a predicted value of a sold amount is computed depending on experience and perception of a parson in charge.

It can be also considered to use distribution of a past sold amount without modification, as the probability distribution of a future sold amount by means of the actual data of the past sold amount. However, if considering so-called "absence of goods", it is considered that a past sold amount is restricted by a stock amount at that time and thus potential demand of a consumer is not properly reflected. That is, when a past sold amount is used without modification as a predicted value of a future sold amount, there is predicted a sold amount less than actual demand. For this reason, by repeating such a prediction, there has been a problem that an amount of purchase goes down in sequence and thus a scale of business comes to shrink.

Next, Patent Documents 8 to 11 will be cited as reference techniques. According to the technique described in Patent Document 8, there is provided a proposal of a technique for supplying a prediction of purchase of the product and other information in considering whether or not the product should be reserved. In this technique, it is described that "probability information" is used for a prediction of purchase (claim 3), however, it is not described how this "probability information" is used for computing a prediction of purchase. Therefore, it is considered that there is not provided a solution of a problem that actual demand cannot be accurately predicted due to generation of "absence of goods".

The technique described in Patent Document 9 is intended for promoting efficiency of production planning in a production line or the like. According to this technique, a future demand is predicted based on demand actual data in the past, and a production planning is streamlined to decrease a supplied amount insufficient for the predicted demand. However, in this document, it is not described how to realize future demand prediction, either. Also, Patent Document 10 describes a technique for predicting a future sold amount based on the past data. This technique is for predicting a trend indicating periodic variation of an achievement of sale to predict a future sold amount along the trend, and it is an objective to improve the accuracy of prediction of the trend. From a macro-perspective, the trend is effective. However, in a micro-problem in which individual shops are addressed, if there is no product available in a shop, a consumer goes to another shop to buy the product, and therefore the sale to be essentially realized by the shop will move to another shop. In other words, since in this technique, there is not provided a consideration of any restriction on a sold amount by a purchase amount, the technique is not effective from the viewpoint of an individual shop. The technique described in Patent Document 11 measures the opportunity loss with an amount of money based on conception of costs incurred by "absence of goods." However, in this technique, this amount of the opportunity loss is not particularly used to predict a future demand.

Therefore, it is an objective of the present invention to provide a system, a method and a program product, which can solve the problems stated above. This objective can be achieved by combining characteristics described in independent claims in the scope of the claims. Dependent claims provide specific examples that are further beneficial in the present invention.

SUMMARY OF THE INVENTION

In order to solve the problems stated above, an embodiment of the present invention provides a system that supports a purchase or a production of a product, the system containing an input section for accepting input of a history of a supplied amount of the product and a history of a sold amount that is a quantity of the product sold among the supplied products, a function generating section for representing a conditional probability function showing probability distribution of the sold amount when the sold amount is restricted by the supplied amount by means of a potential demand probability function including a parameter showing probability distribution of the sold amount when it is supposed that the sold amount is not restricted by the supplied amount and computing a value of the parameter maximizing a value of a likelihood function of the conditional probability function using the input history as a sample, in order to generate the potential demand probability function, and a supplied amount computing section for computing a supplied amount of the products maximizing a profit by a sale of the product, based on the generated potential demand probability function and predetermined selling price and supplying price of the product, and outputting the amount as a quantity of the product to be purchased or produced a program product causing an information processing apparatus to function as the above system, and a method for supporting a purchase or a production by using the above system.

Note that the general description of the invention described above does not enumerate all necessary characteristics of the present invention, and sub-combinations of these characteristics may become the present invention.

According to the present invention, by accurately predicting a potential demand of the product based on a history of supply and sale in the past, it enables to perform an appropriate purchase, and thereby it enables to reduce costs incurred by product disposal and mitigate a risk for loosing the opportunity of sale due to insufficient purchase of the product despite the demand.

BRIEF DESCRIPTION OF THE DRAWINGS

FIG. 2 is a view showing an example of a data structure of a History of Sale DB 20 according to the embodiment of the present invention.

FIG. 5 is a view showing a first result of an experiment for computing a potential demand probability distribution.

FIG. 6 is a view showing a second result of an experiment for computing a potential demand probability distribution.

DETAILED DESCRIPTION OF THE PREFERRED EMBODIMENT

The present invention is described below through an embodiment of the invention. However, the embodiment described below does not limit the invention concerning the scope of the claims, and all combinations of the characteristics described in the embodiment do not necessarily indispensable for a solution of the invention.

Figure 1:
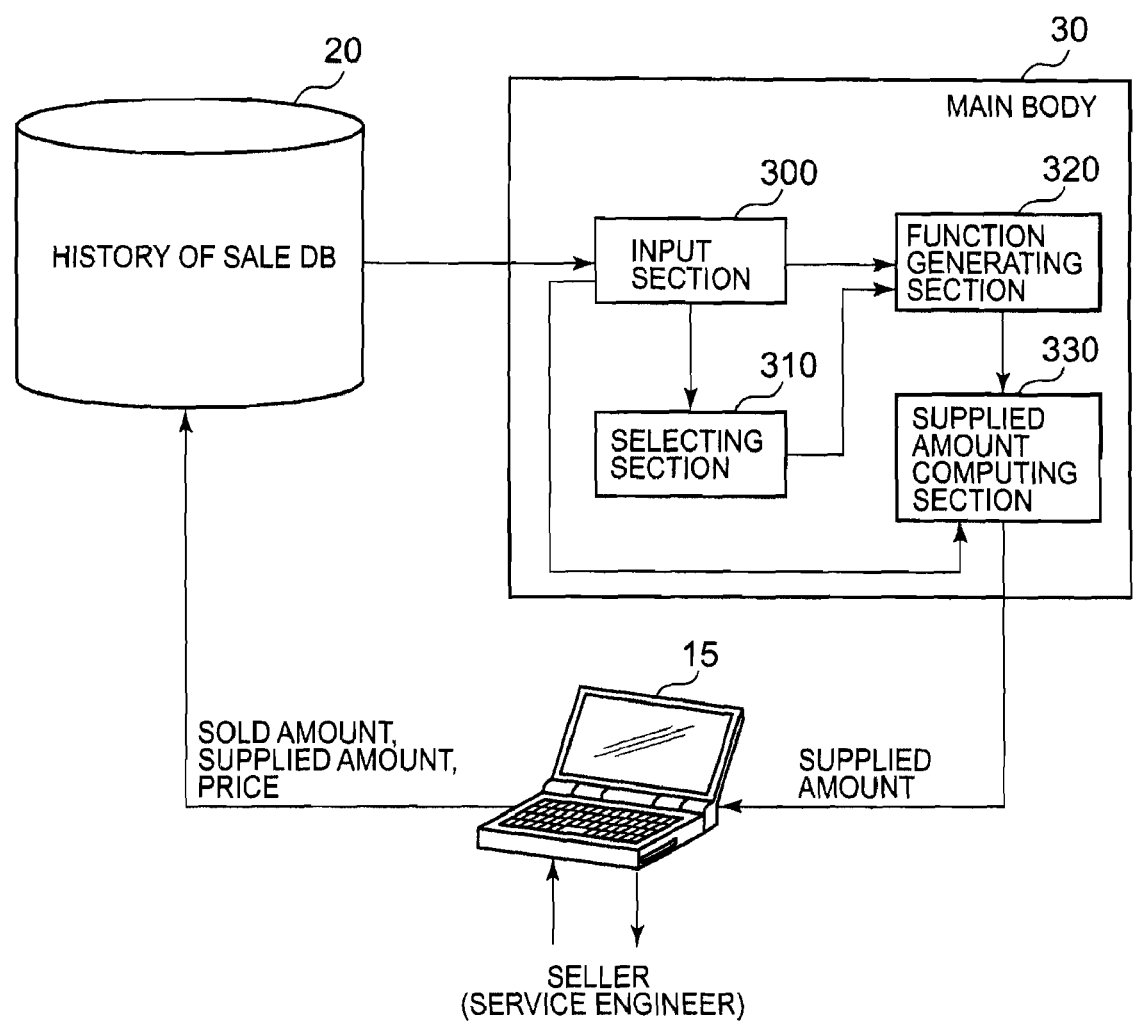
FIG. 1 is a view showing a functional construction of a support system 10 according to an embodiment of the present invention.

FIG. 1 shows a functional construction of a support system 10 according to an embodiment of the present invention. The support system 10 includes a terminal unit 15, a History of Sale DB 20, and a main body 30. The terminal unit 15 is manipulated by a seller at a shop, or by a wholesale distributing agent or a service engineer who has received a request from the seller. Then, the terminal unit 15 accepts an input of a history of a supplied amount of a product supplied in the shop and a history of a sold amount that is a quantity of the product sold among the supplied products, and stores the history in the History of Sale DB 20. More specifically, after setting a forward stock at the initial point in a certain period as a supplied amount and setting the quantity of the product sold within the period as a sold amount, the terminal unit 15 may accept the information thereof for each of multiple periods. Further, the terminal unit 15 may accept an input of information such as a selling price of a product or the like and store the same in the History of Sale DB 20.

Here, a supplied amount represents a quantity of a product supplied to a seller by another party, and a sold amount represents a quantity of a product sold by the seller. A supplying price to be described later represents a price of a product supplied to a seller by the other party, and a selling price represents a price of a product sold by the seller. In case that this seller is a shop such as a retailer, the supplied amount is an amount of stock in the shop at the initial point in a certain period. In this case, a supplying price is a price at which the shop purchased the product. Another example shows that if a seller is a manufacturer of a product, the supplied amount is a quantity of the product produced by the manufacturer. Also in this case, a supplying price is a cost incurred to the manufacturer to produce the product. This cost does not include a cost for discarding dead stock of the product.

The History of Sale DB 20 outputs a recorded history to the main body 30 in response to a request from the main body 30. The main body 30 reads the history from the History of Sale DB 20 and generates a possible probability distribution for a future sold amount based on the read history. The main body 30 computes a supplied amount maximizing an expected profit of the shop or wholesale distributing agent based on the probability distribution and other information such as a selling price. The main body 30 outputs the computed supplied amount to the terminal unit 15 as a quantity of the product to be purchased or produced. As a result, the seller, or the wholesale distribution agent or the service engineer who received a request from the seller can effectively support the management strategy planning or the like of the shop.

In the management supporting system stated above, it is the objective of the main body 30 according to the present invention to provide more effective support for purchase or production of a product by predicting a sold amount with high accuracy.

The main body 30 includes an input section 300, a selecting section 310, a function generating section 320, and a supplied amount computing section 330. The input section 300 accepts an input of a history of a supplied amount and a history of a sold amount that is a quantity of a product sold among the supplied products. To be more specific, histories that have been accumulated and stored in the History of Sale DB 20 are read by the input section 300 from the History of Sale DB 20. The selecting section 310 selects only a history required for predicting a future sold amount from the histories inputted, and then outputs the selected history to the function generating section 320. Note that the selecting section 310 may also output all histories inputted by the input section 300 to the function generating section 320.

The function generating section 320 represents a conditional probability function showing the probability distribution of a sold amount when the sold amount is restricted by a supplied amount by means of a potential demand probability function including a parameter showing the probability distribution of the sold amount when it is supposed that the sold amount is not restricted by a supplied amount. The function generating section 320 then computes a value of the parameter maximizing a value of a likelihood function of the conditional probability function using the inputted history as a sample, in order to generate the potential demand probability function. The supplied amount computing section 330 computes a supplied amount of a product maximizing a profit by a sale of the product based on the generated potential demand probability function and predetermined selling price and supplying price of the product, and then outputs the amount to the terminal unit 15 as a quantity of the product to be purchased or produced.

FIG. 2 shows an example of data construction of the History of Sale DB 20 according to the embodiment of the present invention. The History of Sale DB 20 stores history data 200-1 to 200-N as history data corresponding to each of a plurality of sellers. As a representative example of the history data 200-1 to 200-N, the history data 200-1 is described. The history data 200-1 records the data for each predetermined period, for example, in case of date and hour, a supplied amount (a quantity of forward stock) at the beginning of the day (at the time of opening a shop), a sold amount until the end of the day (at the time of closing the shop), and a price for the day. A supplied amount is not a purchase amount but a quantity of a product available in a shop. In case of data on the daily basis, a difference between a forward stock at the beginning of a day and a forward stock at the end of the day is a sold amount, and a difference between a forward stock at the end of the day and a forward stock at the beginning of the following day is a supplied amount. The appropriate predetermined period can be determined on the basis of purchasing patterns.

For example, the forward stock at the beginning of May 1, 2005 is 2050, the quantity of a product sold on May 1, 2005 is 1890, and the selling price thereof is 1020. Receiving new stock on May 2, 2005, the forward stock increases to 2300, and the quantity of a product sold on May 2, 2005 becomes 2120. Further, the forward stock at the beginning of May 4, 2005 is 2800, and the quantity of the product sold on May 4, 2005 is 2800. In other words, the product runs out of stock on May 4, 2005, and thus the sold amount is restricted by the forward stock. Note that the sold amount and supplied amount that have been recorded may be either a discrete value or a continuous value, depending on characteristics of each product.

In the example in FIG. 2, since the sold amounts on May 1st, 2nd, 5th, and 6th are less than the supplied amounts, it is considered that the sold amount for each month as above appropriately reflects a consumer's demand. On the other hand, the sold amounts on May 3rd and 4th are restricted by the supplied amounts due to absence of goods. Therefore, the sold amount for each day does not reflect a consumer's demand appropriately, and if there had been a plenty of forward stock, it is considered that the sold amount would have been further larger. It is an objective of the support system 10 according to this embodiment to predict a potential demand without any underestimation after consideration of a decrease in a sold amount due to "absence of goods" as stated above, based on the history of a sold amount and that of a supplied amount.

In associating this history sample with the probability function, it is permitted to associate the same with a probability function differing for each day of a week, or a probability function differing by each week. Alternatively, the History of Sale DB 20 may get together a sold amount and a supplied amount for each similar product having the same product characteristics, in order to store the same in association with the same probability function. In other words, the History of Sale DB 20 may categorize sold amounts, supplied amounts, and selling prices in accordance with a predetermined period or the conditions of the product or a selling day, and then may store the same. The period and conditions used for such categorization may be changed in accordance with a purpose of a prediction of sale. Determining, in advance, a model of how to categorize history samples and associate the same with a potential demand probability function, the system collects necessary history samples to generate a potential demand probability function based on the predetermined model.

Figure 3:
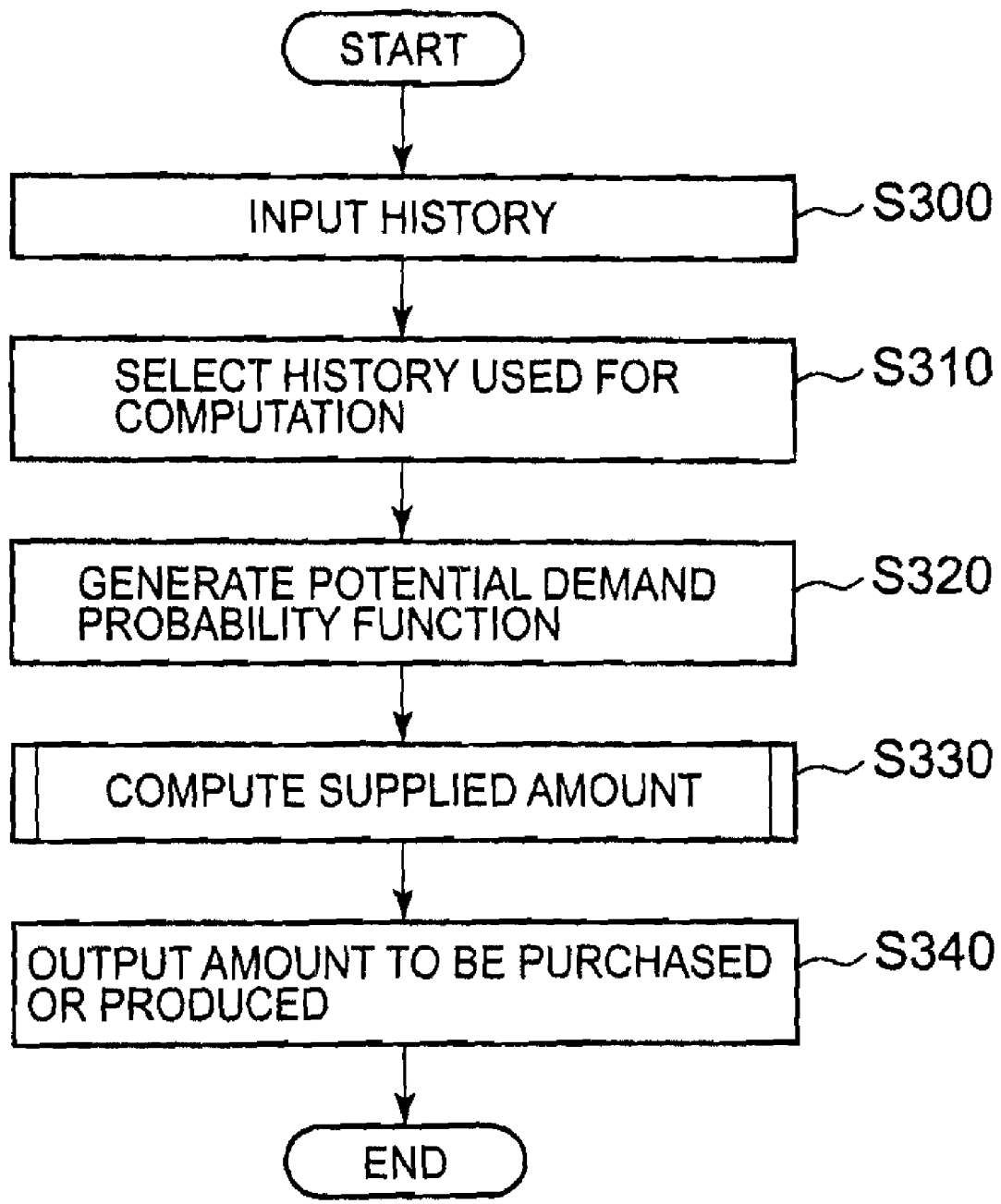
FIG. 3 is a flowchart of processing for computing a potential demand probability function by the support system 10 according to the embodiment of the present invention to obtain a supplied amount.

FIG. 3 shows a flowchart of processing for computing a potential demand probability function and a supplied amount by the support system 10 according to the embodiment of the present invention. First of all, the input section 300 accepts an input of a history of a supplied amount of a product and a sold amount of the product among the supplied products (S300). The history of a supplied amount and a sold amount may also be inputted for each shop that is a seller of the product. In other words, the input section 300 may accept an input of a history of a supplied amount of a product for each seller and a history of a sold amount of a product in the shop. In addition, the input section 300 may accept a history of a selling price of a product.

The set of a supplied amount and a sold amount included in the inputted history is represented as $(m_i, n_i)$. Also, the upper limit of the suffixes of m and n is to be I. In other words, the inputted supplied amount and sold amount range from $m_1$ to $m_I$, and $n_1$ to $n_I$, respectively. To be more specific, in the example shown in FIG. 2, the supplied amount on May 1, 2005 is represented as $m_1$, and the sold amount on the same day is represented as $n_1$. Similarly, the supplied amount on May 2, 2005 is represented as $m_2$, and the sold amount on the same day is represented as $n_2$. However, the suffix i does not necessarily correspond to consecutive dates, but is simply indicated according to the order that a history sample is stood in lines by chance at the time of being inputted.

The selecting section 310 selects only a part necessary for predicting a future sold amount among the inputted histories (S310). For example, the selecting section 310 may select a set of a sold amount and a supplied amount in the case where the sold amount is less than the supplied amount by a predetermined difference value or more among the inputted histories. If this predetermined difference value is assumed to be M, the selecting section 310 may select a set of a supplied amount and a sold amount, $(m_i, n_i)$ which satisfies $n_i \leq m_i - M$. By selecting only a part of the histories as above, time required for subsequent computation can be reduced. Also, even if only a part of the histories is used for computation, it is considered that a potential demand can be predicted with relatively high accuracy by selecting a history where a sold amount is not restricted by a supplied amount.

The function generating section 320 computes a parameter of a potential demand probability function using the selected set of a sold amount and a supplied amount as a sample, thus generating a potential demand probability function (S320). Below are the detailed descriptions of this computing process.

(1) Probability Model of Probability Distribution Indicating a Potential Demand:

Assume that a discrete variable representing a sold amount is to be n. In this case, a potential demand probability function p(n) indicating the probability distribution of a potential demand satisfies $p(n) \geq 0$ and $\Sigma^\infty_{n=0} p(n)=1$. Also assume that a continuous variable representing a sold amount is to be x. In this case, a potential demand probability function p(x) satisfies $p(x) \geq 0$ and $\int^\infty_0 p(x)dx=1$. In this embodiment, the potential demand probability function p(n) or p(x) is modeled by a predetermined function form including a parameter. This function form may be any form as long as the same satisfies the above conditions. Specific modeling examples are described below.

Poisson distribution is known as a model of a sold amount during a certain period. A probability function p of Poisson distribution is represented as $p(n)=(\lambda^n/n!)\exp(-\lambda)$. Here, p(n) represents the probability that a sold amount is n. In Poisson distribution, since there is only one parameter $\lambda$ in the probability function, it is not possible to appropriately determine a probability model of a sold amount using a sold amount history. For example, in Poisson distribution, a ratio between average and dispersion is always 1, however in reality, that is not the case for the distribution of a sold amount. Poisson distribution is derived from the following assumptions: (A) a plurality of consumers come to buy products independently from each other in terms of time; and (B) each consumer buys only one product. However, in reality, a consumer buys a plurality of products at once. Therefore, by eliminating the assumption (B), a more practical probability model may be obtained. Based on the remaining assumption (A), a general form of the probability function p(n) is obtained by developing a generating function (Equation 1-1) including a new function u(z) for a parameter z.

[Equation 1-1]

$$\exp(u(z)) = \sum_0^\infty p(n)z^n \qquad \text{equation (1-1)}$$

Here, u(z) is an analytic function u(1)=0. In this case, an average value <n> and a dispersion <(n-<n>)2> are given in accordance with the following Equations 1-2 and 1-3.

[Equation 1-2]

$$<n> = \frac{\partial u}{\partial z}\bigg|_{Z=1} \qquad \text{equation (1-2)}$$

[Equation 1-3]

$$<(n-<n>)^2> = \frac{\partial^2 u}{\partial z^2}\bigg|_{Z=1} + \frac{\partial u}{\partial z}\bigg|_{Z=1} \qquad \text{equation (1-3)}$$

Poisson distribution is obtained by substituting $u(z)=\lambda(z-1)$ into this equation. Here, $\lambda$ is a parameter to be determined from a history. By further adding a parameter to u(z), a probability function indicating a more flexible probability model can be obtained. For example, when $u(z)=\lambda(z-1)/(1-az)$ is used, it is possible to obtain a probability function where an average is $\lambda/(1-a)$ and a dispersion is $\lambda(1+a)/(1-a)^2$. Also, P(n) can be computed from the following recurrence equations (Equations 1-4, 1-5, and 1-6). $\lambda$ and a are parameters to be determined from a history.

[Equation 1-4]

$$p(0)=\exp(-\lambda) \qquad \text{equation (1-4)}$$

[Equation 1-5]

$$p(1)=\lambda(1-a)\exp(-\lambda) \qquad \text{equation (1-5)}$$

[Equation 1-6]

$$p(n+1) = \frac{1}{n+1}((2an + \lambda(1-a))p(n) - a^2(n-1)p(n-1)) \quad \text{equation (1-6)}$$

Generally, by using polynomials P(z) and Q(z) for z with a parameter serving as a coefficient, $u(z)=\lambda P(z)/Q(z)$ is obtained, thus increasing the number of parameters. The recurrence equations can be easily obtained by developing Equation 1-7 for z.

[Equation 1-7]

$$\left(Q\frac{\partial P}{\partial z} - P\frac{\partial Q}{\partial Z}\right)\sum_0^\infty p(n)z^n = Q^2 \sum_0^\infty np(n)z^{n-1} \quad \text{equation (1-7)}$$

Where a sold amount is a continuous variable x, a common function form is, for example, an Erlang function $p(x) = ((x/a)^k/(k-1)!\exp(-ax))$, or $p(x)=(1/\sqrt{2\pi})\exp(-u^2/2)du/dx$ which is obtained by mapping a Gaussian function to interval $[0, \infty]$ with an inverse function (x) of $x=a.\exp(b(u-b/2))$. Moreover, a more flexible function form such as $p(x)= A\exp(-ax)+B\exp(-bx)+C\exp(-cx)+ \ldots$ may be employed. Here, A, a, B, b, C, c, . . . are the parameters to be determined.

As a more flexible function form, there is a numeric value table where a sold amount and probability are associated with each other. Regarding a sold amount that is not entered in the numeric value table, the probability value may be complemented based on the other probability value.

As described so far, the potential demand probability function (p(n) or p(x)) is represented as a function form having at least one parameter.

(2) Method for Representing a Conditional Probability Function Using a Potential Demand Probability Function:

As described in FIG. 2, since the upper limit of a sold amount included in the history is defined to be a supplied amount, a potential demand is not properly reflected if the sold amount is used without modification. Therefore, if a parameter for a potential demand probability function is computed using the sold amount included in this history as a sample, a correct potential demand probability function cannot be generated. Hence, the function generating section 320 represents a conditional probability function by means of a parameter for a potential demand probability function. For example, the function generating section 320 represents a conditional probability function as a function computing the same probability value as a potential demand probability function in terms of a sold amount less than a supplied amount, and also represents the same as the function computing a total value of probabilities that a sold amount becomes equal to or more than a supplied amount among the probabilities computed by the potential demand probability function in terms of a sold amount equal to a supplied amount (Equation 2-1).

[Equation 2-1]

$$P(n|m_i, a, b, c, \ldots) = \begin{cases} F(n|a, b, c, \ldots) & \text{if } n < m_i \\ \sum_{n=m_i}^{\infty} F(n|a, b, c, \ldots) & \text{if } n = m_i \end{cases} \quad \text{equation (2-1)}$$

In this equation, F represents a potential demand probability function, and a, b, c, . . . represent parameters of the potential demand probability function. Thereafter, a conditional probability function P is represented using the function F. Sign n represents a probability variable indicating a sold amount and sign $m_i$ indicates a supplied amount.

Where a supplied amount and a sold amount are given as continuous values, the function generating section 320 represents a conditional probability function as follows by means of a potential demand probability function. That is, for a sold amount and a supplied amount that are continuous variables, the function generating section 320 represents a conditional probability function as the same probability density as that of a potential demand probability function, in terms of a sold amount less than a supplied amount, and also represents the same as an integration value obtained by integrating the probability densities computed by a potential demand probability function for the cases where a sold amount is equal to or more than a supplied amount, in terms of a sold amount equal to a supplied amount.

Figure 4:
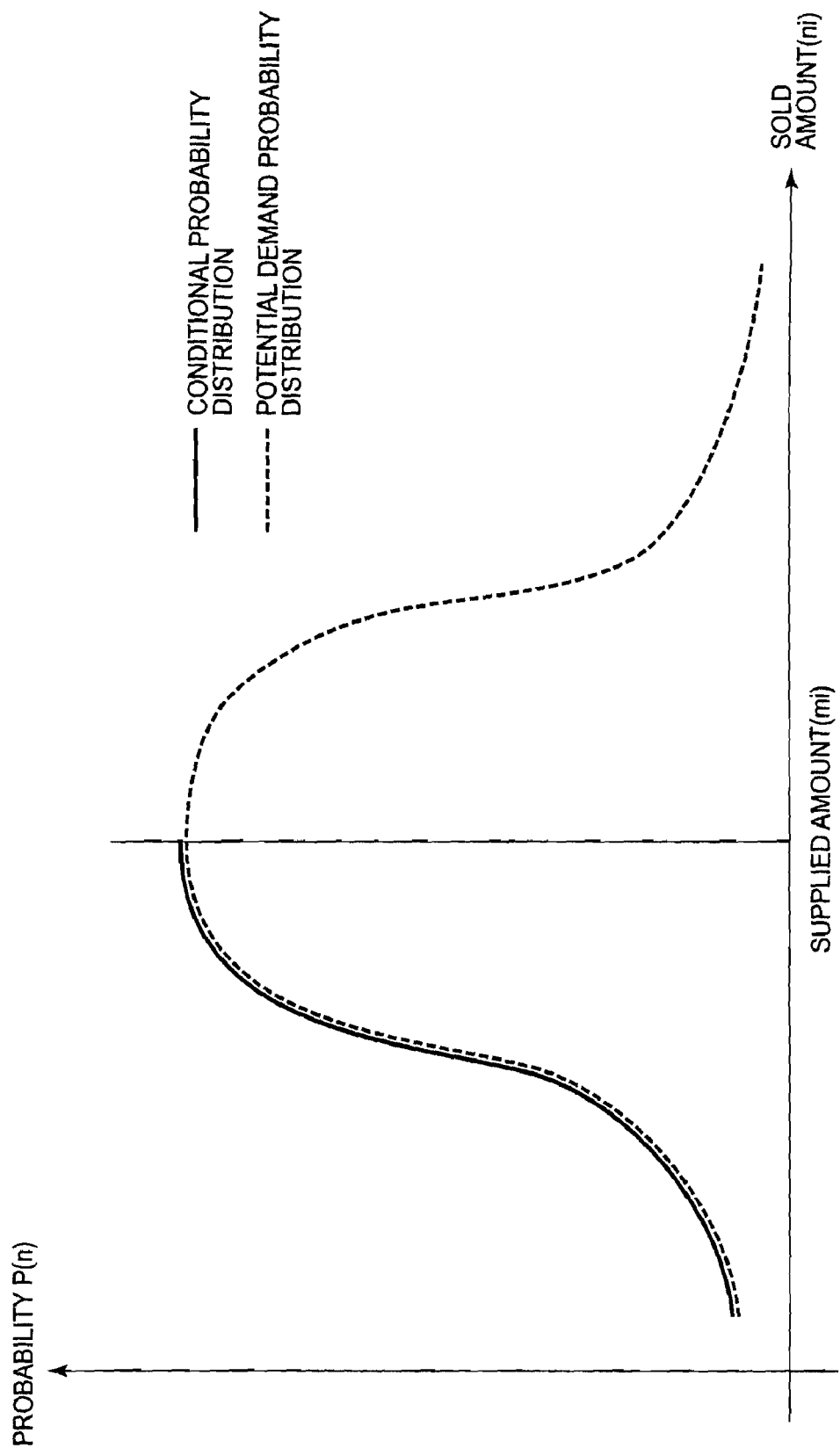
FIG. 4 is a view showing an example of a potential demand probability distribution and a conditional probability distribution.

FIG. 4 shows examples of a potential demand probability distribution and a conditional probability distribution. In this graph, a broken line represents a potential demand probability distribution, and a solid line represents a conditional probability function. When a sold amount is less than a supplied amount, the conditional probability distribution follows the potential demand probability distribution, and when a sold amount is equal to a supplied amount, the conditional probability distribution is the sum of the probabilities in the potential demand probability distribution in which a sold amount is equal to or more than a supplied amount.

Returning to FIG. 3, the function generating section 320 computes a value of a parameter maximizing the likelihood function L of this conditional probability function P as an inputted history sample. The likelihood function L may be, for example, a function computing the log likelihood like Equation 2-2. Thereafter, the function generating section 320 computes a parameter value maximizing the product of the probabilities indicated by the conditional probability function relative to a set of a supplied amount $m_i$ and $n_i$ included in the inputted history, by maximizing the value of Equation 2-2.

[Equation 2-2]

$$L(a, b, c, \ldots) = \sum_{i=1}^{I} \log P(n_i|m_i, a, b, c, \ldots) \quad \text{equation (2-2)}$$

To be more specific, the function generating section 320 substitutes the probabilities of occurrences of sold amounts in the history under the restriction of the supplied amounts in the history to the conditional probability function included in the likelihood function L. In other words, the function L is represented as an equation using $P(n_1|m_1, a, b, c \ldots)$, $P(n_2|m_2, a, b, c \ldots), \ldots, P(n_I|m_I, a, b, c \ldots)$.

Thereafter, the function generating section 320 replaces each of the substituted probabilities by probability equations based on the potential demand probability function. In other words, the equation using $P(n_1|m_1, a, b, c \ldots)$, $P(n_2|m_2, a, b, c \ldots), \ldots,$ and $P(n_I|m_I, a, b, c \ldots)$ is rewritten to an equation that uses $F(n_1|m_1, a, b, c \ldots)$, $F(n_2|m_2, a, b, c \ldots), \ldots,$ and $F(n_I|m_I, a, b, c \ldots)$ by Equation 2-1. The rewritten equation L may include a symbol $\Sigma$ or the like, following Equation 2-1. Then, the function generating section 320 causes the main body 30, which is a computer, to compute a value of parameter maximizing the likelihood function L for which the sold amounts and supplied amounts in the history are substituted. Normally, maximization of the likelihood function can be solved analytically, however, in this case, an analytic solution is not possible. Therefore, a parameter numerically maximizing the likelihood function is computed. For this numeric analysis method for maximization, refer to Non-patent document 4 or 5, for example.

(3) Method for Using Only a Part of Histories for Computation:

Where only a part of histories is selected in S310, the function generating section 320 uses the selected part of the histories as a sample and computes a parameter using a maximum-likelihood method. When a predetermined positive quantity is M, and among sets of a sold amount n and a supplied amount $m_i$ (n, $m_i$), a set of satisfying $n \leq m_i - M$ is selected, a conditional probability function P' in this case is represented in accordance with the following Equation 2-3.

[Equation 2-3]

$$P'(n|m_i|a, b, c, \ldots) = F(n | a, b, c, \ldots) / \sum_{n=0}^{m_i - M} F(n | a, b, c, \ldots) \quad \text{equation (2-3)}$$

This conditional probability function P' is a function obtained by normalizing a potential demand probability function with the premise that the probability that a sold amount is less than a supplied amount by a difference value M or more is 1. In other words, this conditional probability function P' is represented as a formula to compute a conditional probability value (or probability density) under condition that a sold amount is less than a supplied amount by the difference value M or more.

The likelihood function L' of this conditional probability function P' is represented by Equation 2-4 below.

[Equation 2-4]

$$L'(a, b, c, \ldots) = \sum_{i=1}^{I} \log P'(n_i|m_i|a, b, c, \ldots) \quad \text{equation (2-4)}$$

The function generating section 320 may also numerically compute a parameter maximizing the likelihood function L'.

(4) Likelihood Function when a Sold Amount is a Continuous Variable:

In the above cases (1) to (3), there was provided a description of a method for computing a parameter of a potential demand probability function, when a sold amount is represented by a discrete vale. On the other hand, when a sold amount is a continuous variable, the likelihood function L is represented by Equation 2-5 shown below. In this equation, a function F including parameters a, b, c, . . . is a potential demand probability function for a sold amount $x_i$ that is a continuous variable. Also, the inputted history includes a set of a supplied amount $y_i$ and a sold amount $x_i$ that are a continuous variable. The functional generating section 320 computes a parameter value maximizing the likelihood function L, thus appropriately generating a potential demand probability function even if a sold amount is represented by a continuous variable.

[Equation 2-5]

$$L(a, b, c, \ldots) = \sum_{i=1}^{I} \log F(x_i | a, b, c, \ldots) - \sum_{i=1}^{I} \log\left(\int_0^{y_j} F(x | a, b, c, \ldots) dx\right) + \sum_{i=I+1}^{J} \log\left(\int_{y_j}^{\infty} F(x | a, b, c, \ldots) dx\right) \quad \text{equation (2-5)}$$

When histories of a plurality of sellers are inputted, the function generating section 320 may estimate the maximum likelihood of a parameter of a conditional probability function of the seller for each of the plurality of sellers so that a potential demand probability function of the seller can be computed.

Next, the supplied mount computing section 330 computes a supplied amount of a product maximizing a profit by a sale of the product based on the generated potential demand probability function, a predetermined selling price and a supplying price of the product (S330). A specific example of this processing is described below.

Here, a selling price per product is represented as s, and a cost per product such as a production cost or a purchase cost needed regardless of sold or not sold is represented as c. This cost is an example of a supplying price according to the present invention. Also, a cost per product needed only for a sold product is represented as c2, and a cost per product needed only for an unsold product such as a product discarding cost is represented as c3. Where N represents a supplied amount and n represents a sold amount, a profit is represented as an $-b(N-n)$. Here, $a=s-c_1-c_2$, and $b=c_1+C_2$. (Note that the selling price, supplying price and a discarding cost described above may be constants preliminarily given regardless of a sold price shown in FIG. 2, or maybe prices selected from among the selling prices in FIG. 2.)

Therefore, when a supplied amount is N, an expectation E(N) of profit is given by Equation 3-1 below.

[Equation 3-1]

$$E(N) = \sum_{n=0}^{N} (an - b(N-n))p(n) + aN \sum_{n=N+1}^{\infty} p(n) \quad \text{equation (3-1)}$$

The next equation (Equation 3-2) is obtained by using this expectation E(N). Moreover, Equation 3-3 is obtained from Equation 3-2. The value of Equation 3-3 is always equal to 0 or less according to the definitions of variables a and b, and the definition of p(N). Therefore, Equation 3-2 is a monotonically decreasing function. Hence, it is understood that the function E(N) indicating an expected profit is an upward convex function in addition to having a maximum value. Consequently, the supplied amount computing section 330 computes the value of Equation 3-2 while sequentially increasing the value N from 0, and can compute the value of N in case that the value of Equation 3-2 changes from 0 or more to 0 or less, as a supplied amount maximizing an expected profit. Note that, when a sold amount is given as a continuous value, the supplied amount computing section 330 can compute the value of x that satisfies Equation 3-4 below, as a supplied amount maximizing an expected profit.

[Equation 3-2]

$$E(N+1) - E(N) =$$ equation (3-2)
$$a \sum_{n=N+1}^{\infty} p(n) - b \sum_{n=0}^{N} p(n) = a - (a+b) \sum_{n=0}^{N} p(n)$$

[Equation 3-3]

$$(E(N+1)-E(N))-(E(N)-E(N-1))=-(a+b)p(N)$$ equation (3-3)

[Equation 3-4]

$$\frac{dE}{dx} = a \int_{0}^{x} p(x)\,dx - b \int_{x}^{\infty} p(x)\,dx = 0$$ equation (3-4)

Next, the supplied amount computing section 330 outputs the computed supplied amount to the terminal unit 15 as a quantity of a product to be purchased or produced (S340). There may be a case where a specific range is determined for a supplied amount to be adopted depending on seller's circumstances. For example, in order to extend and maintain the share, there may be a case where a seller wants to decide a supplied amount as to be equal to or more than a certain lower limit even if there is a risk of dead stock. Also, there may be a case where a seller wants to decide a supplied amount of a product as to be equal to or less than an upper limit depending on the factory's production capability or distribution capability, even if there is a risk of absence of goods. Where the computed supplied amount is within a range of a supplied amount decided by a seller, the supplied amount computing section 330 outputs the computed supplied amount as a quantity of the product to be purchased or produced.

On the other hand, where the computed supplied amount is outside the abovementioned range, the supplied amount computing section 330 outputs the value of the upper limit or the lower limit of the above range as a quantity to be purchased or produced. To be more specific, since it is already known from Equations 3-2 and 3-3 that a function indicating an expected profit is an upward convex function having a maximum value, it is understood that a supplied amount maximizing an expected profit is either the lower limit or the upper limit of such a range. In other words, where the computed supplied amount is equal to or less than the lower limit of the range, the supplied amount computing section 330 outputs the value of the lower limit of the range as a quantity to be purchased or produced. Alternatively, where the computed supplied amount is equal to or more than the upper limit of the range, the supplied amount computing section 330 outputs the upper limit value of the range as a quantity to be purchased or produced.

As stated so far, according to the processing shown in FIG. 3, it is possible to compute a purchase amount maximizing a profit with consideration for a profit by a sale and a loss by dead stock, regardless of whether a sold amount is given by any of a discrete value or a continuous value. Moreover, even in such a practical situation that a range is set for a supplied amount, it is possible to appropriately compute a supplied amount maximizing an expected profit.

FIG. 5 shows the first result in an experiment for computing a potential demand probability distribution. In this experiment, $u(z)=\lambda(z-1)/(1-az)$ in the description of S320 in FIG. 3 was used as a potential demand probability function. There are two parameters, $\lambda$ and a, in this function. There is provided, in advance, preparation of a system in which data is outputted at random in accordance with the probability distribution with the average of 64 and disperse/average of 3. Thereafter, a predetermined value data is outputted from this system and this data is assumed to be a sold amount obtained as a dummy. Specifically, this system was made to output each number of data of 32, 64, 128, 256, and 512. Also, the supplied amount (forward stock) was fixed at 64. FIG. 5 shows the average and disperse of the potential demand probability function generated by the support system 10 according to the embodiment, using the sets of the above-mentioned sold amounts and supplied amounts as samples. As for a numerical solution to maximize the likelihood function, using the technique described in Non-patent document 4, there is provided, in addition, an indication of the counts of repeated processes performed by the time the probability distribution converged in a convergent computation in the above technique. This computation was executed stably and quickly.

According to FIG. 5, it was proved that as long as there is sufficiently a large number of data to be used as samples, a potential demand probability distribution could be appropriately generated.

FIG. 6 shows the second result in an experiment for computing a potential demand probability distribution. In this experiment, the value data is fixed at 128, and there is provided an indication of the average and disperse of the potential demand probability function computed based on a sold amount restricted by the supplied amount for each supplied amount (forward stock). It was proved to be able to obtain generally similar probability distributions for any of the supplied amounts.

Figure 7:
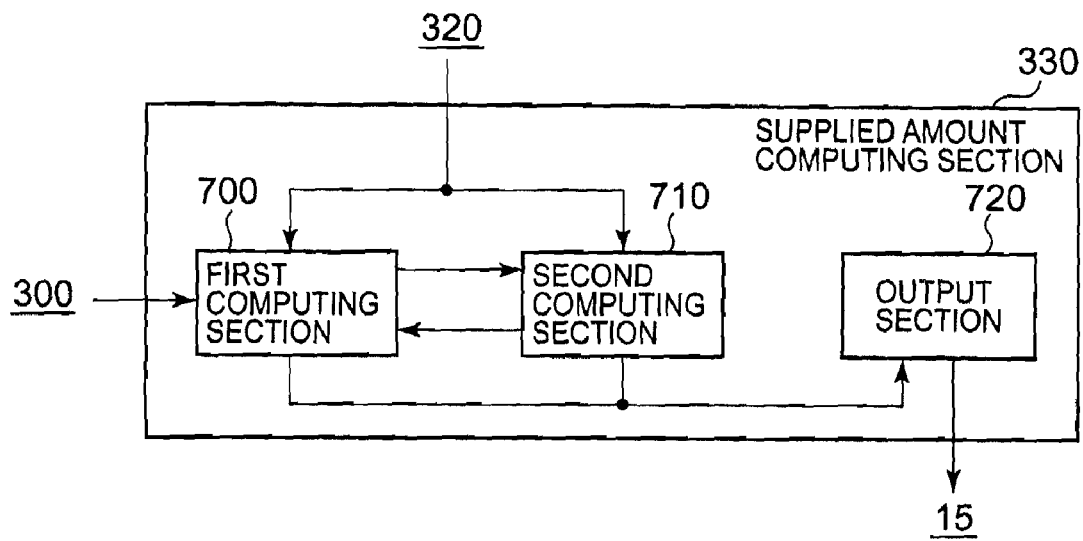
FIG. 7 is a view showing a functional construction of a supplied amount computing section 330 according to a first modification example.

FIG. 7 shows a functional construction of a supplied amount computing section 330 according to the first modification example. It is an objective of the first modification example to compute and output not only a supplied amount maximizing a profit but also a selling price by using a history of a selling price stored in a History of Sale DB 20. In the first modification example, a potential demand probability function is set to be a function F(n|s|a, b, c . . . ) of a selling price s and a sold amount n. In this function, parameters to be decided based on the history are a, b, c, . . . . This potential demand probability function may follow the probability model stated in the description for the case (1) for S320 of FIG. 3. A conditional probability function P(n|m$_i$, s$_i$|a, b, c . . . ) of a supplied amount m$_i$ depending on a selling price is represented as follows using the potential demand probability function.

[Equation 4-1]

$$P(n|m_i s_i | a, b, c, \ldots) = \begin{cases} F(n|s_i|a, b, c, \ldots) & \text{if } n < m_i \\ \sum_{m=m_i}^{\infty} F(m|s_i|a, b, c, \ldots) & \text{if } n = m_i \end{cases}$$ equation (4-1)

By using this conditional probability function, the likelihood function is represented as the next Equation 4-2. In other words, the function generating section 320 numerically computes a value of a parameter maximizing the value of the following likelihood function by using the function of an information processing apparatus 400 described later.

[Equation 4-2]

$$P(n|m_i s_i|a, b, c, \ldots) = \begin{cases} F(n|s_i|a, b, c, \ldots) & \text{if } n < m_i \\ \sum_{m=m}^{\infty} F(m|s_i|a, b, c, \ldots) & \text{if } n = m_i \end{cases} \quad \text{equation (4-2)}$$

Hereinafter, the function to compute a parameter of this potential demand probability function will be described in detail.

The supplied amount computing section 330 includes a first computing section 700, a second computing section 710, and an output section 720. The first computing section 700 computes a supplied amount of the product maximizing a profit by a sale of the product, based on the potential demand probability function generated by the function generating section 320 as well as a predetermined selling price and a supplying price. This computing process is the same as the process of S330 in FIG. 3 where a selling price s, cost c1, or the like are constants.

The second computing section 710 computes a selling price maximizing a profit by a sale of the product, based on the potential demand probability function generated by the function generating section 320, the supplied amount computed by the first computing section 700, and a predetermined selling price, and sends the computed selling price to the first computing section 700. For example, in the second computing section 710, the potential demand probability function may be modeled by using not only a supplied amount but also a selling price as probability variables, and the probability variable representing a supplied amount is fixed at a value computed by the first computing section 700. Then, the second computing section 710 may compute a selling price maximizing an expected profit based on the probability function.

The output section 720 causes the first computing section 700 and the second computing section 710 to compute a supplied amount and a selling price alternately, and on condition that computed selling price and supplied amount converge to a given range, the output section 720 outputs the converged selling price and supplied amount to the terminal unit 15.

Figure 8:
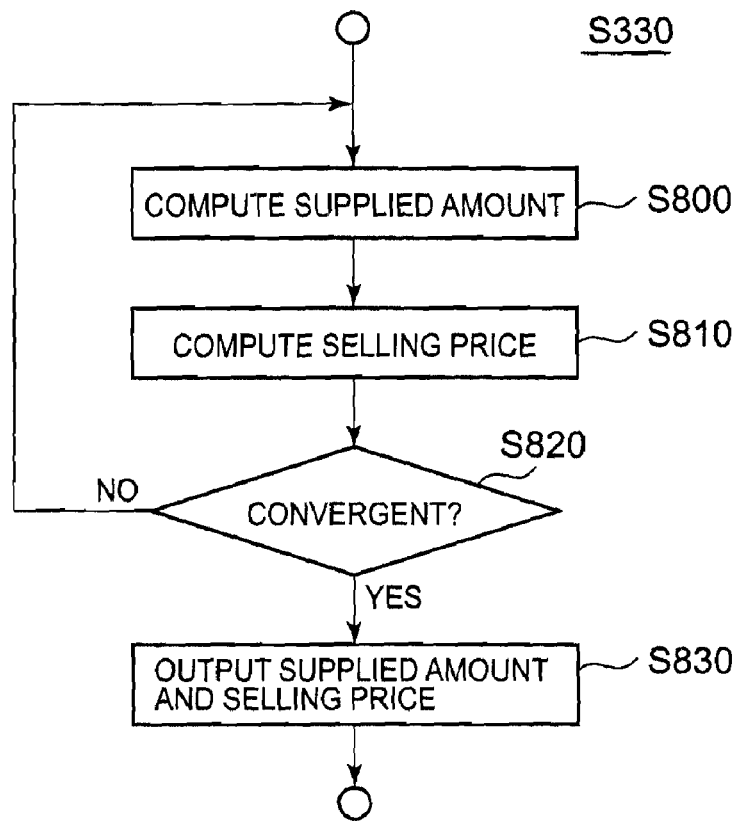
FIG. 8 is a flowchart of processing for computing a supplied amount and a selling price by the supplied amount computing section 330 according to the first modification example.

FIG. 8 shows a flowchart of processing for computing a supplied amount and a selling price by the supplied amount computing section 330 according to the first modification. The first computing section 700 computes a supplied amount of the product maximizing an expected profit by a sale of the product, based on a potential demand probability function generated by the function generating section 320 as well as a given selling price and a supplying price (S800). The second computing section 710 computes a selling price maximizing a profit by a sale of the product, based on the potential demand probability function generated by the function generating section 320, the supplied amount computed by the first computing section 700, and a preliminarily given supplied price, and then sends the computed selling price to the first computing section 700 (S810).

The output section 720 determines whether or not the computed selling price and supplied amount have converged within a predetermined range (S820). If those have not converged (S820: NO), the support system 10 returns the processing to the S800. On the other hand, if those have converged (S820: YES), the output section 720 outputs converged selling price and supplied amount to the terminal unit 15 (S830). Now, the order of processing S800 and S810 are not considered. For example, the second computing section 710 may first compute a selling price and give the same to the first computing section 700, and then the first computing section 700 may compute a supplied amount maximizing an expected profit and give the same to the second computing section 710. In this case, an initial value of a supplied amount is given to the second computing section 710, and determination of convergence is performed after the first computing section 700 computes a supplied amount.

As described so far, according to the first modification example, with the use of a history of selling prices, it is possible to compute not only a supplied amount but also a selling price which maximize a profit, and it enables to support a management strategy of a seller.

Figure 9:
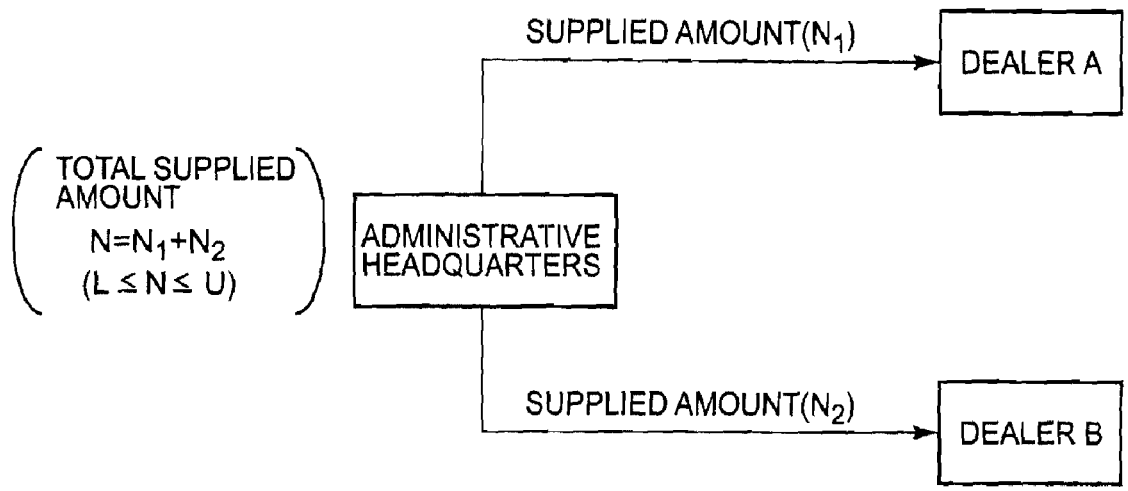
FIG. 9 is a view showing an example of a distribution form in which a second modification example should be applied.

FIG. 9 shows an example of a distribution form to which the second modification example should be applied. This distribution form includes a dealer A, a dealer B, and an administrative headquarters which manages the dealers. The administrative headquarter provides the dealer A with a product, and the supplied amount of the product is represented by N1. The administrative headquarter provides the dealer B with a product, and the supplied amount of the product is represented by $N_2$. The total amount of the product supplied by the administrative headquarters to the dealer A and the dealer B is represented by N. For the range of the values that this total amount of supplied amounts can take (hereinafter, referred to as a specified range), there is defined an upper limit U and a lower limit L.

It is an objective of the second modification example to compute a supplied amount N maximizing a profit of the entire group including the dealer A and dealer B in this distribution form within the predetermined range from the upper limit U to the lower limit L.

Figure 10:
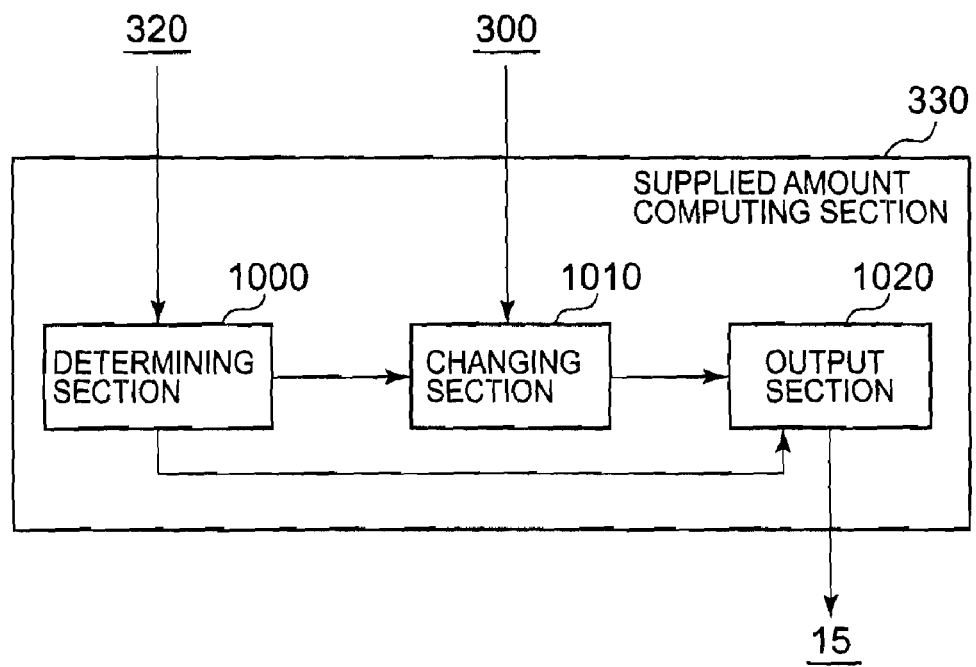
FIG. 10 is a view showing a functional construction of a supplied amount computing section 330 according to the second modification example.

FIG. 10 shows a functional construction of a supplied amount computing section 330 according to the second modification example. The supplied amount computing section 330 includes a determining section 1000, a changing section 1010, and an output section 1020. The determining section 1000 acquires the value of a parameter of a potential demand probability function generated for each seller from the function generating section 320. Thereafter, the determining section 1000 determines whether or not the total supplied amount maximizing a value of the potential probability function generated for each seller is within the specified range. On condition that the total supplied amount is outside the specified range, the changing section 1010 computes an expected profit to be decreased when a supplied amount for each seller is changed in order to bring the total supplied amount close to the specific range, and thereafter, selects a seller who has the smallest expected profit to be decreased, in order to decrease the supplied amount to the seller.

On condition that the total supplied amount is still outside the range regardless of the decrease in a supplied amount by the changing section 1010, the output section 1020 causes the changing section 1010 to further change a supplied amount. Thereafter, on condition that the total supplied amount has entered into the specified range according to the further change of the supplied amount by the changing section 1010, the output section 1020 outputs a supplied amount including the changed supplied amount for each seller.

Figure 11:
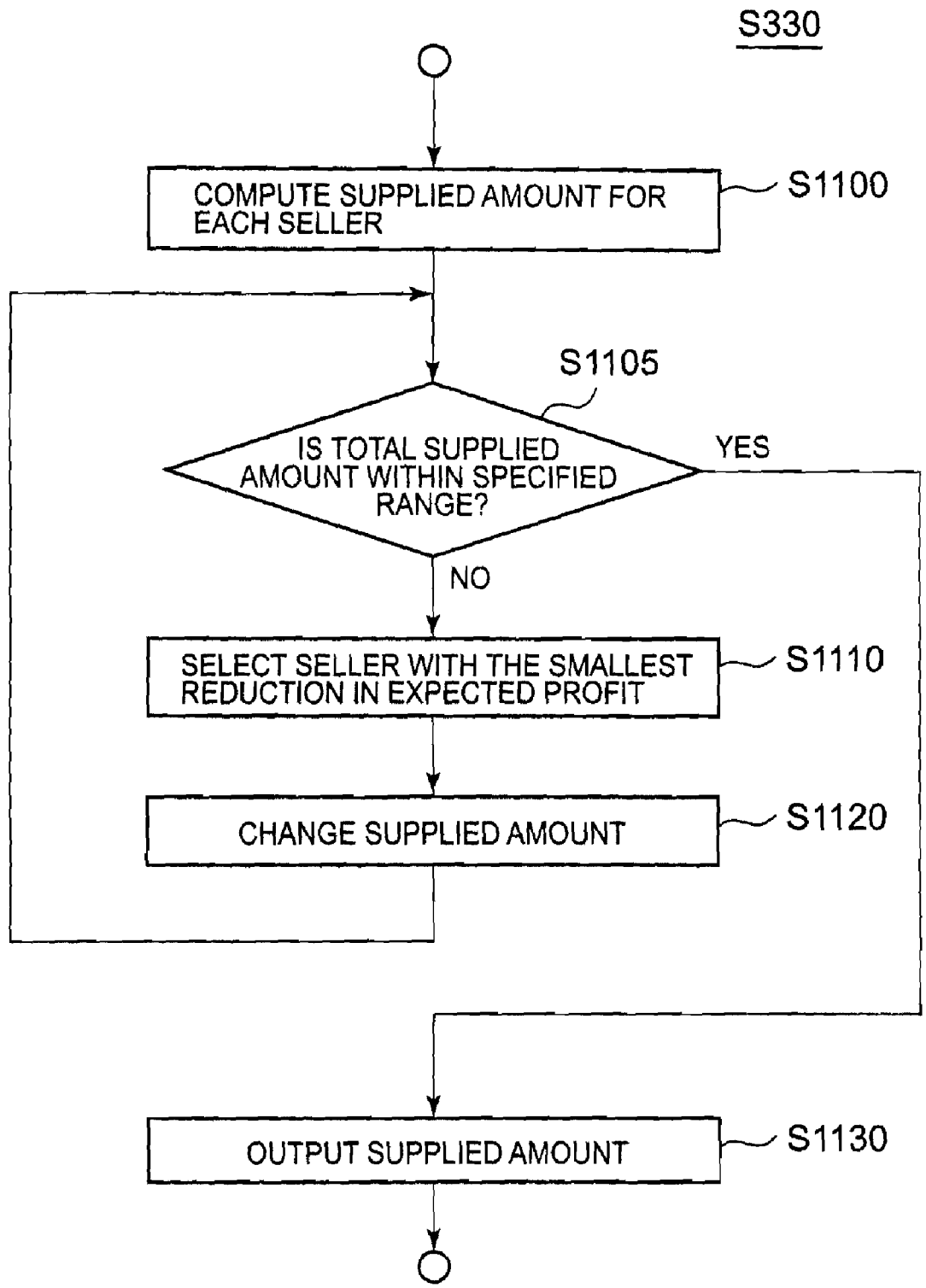
FIG. 11 is a flowchart of processing for computing a supplied amount by the supplied amount computing section 330 according to the second embodiment example.

FIG. 11 shows a flowchart of processing for computing a supplied amount by the supplied amount computing section 330 according to the second modification example. The supplied amount computing section 330 first computes a supplied amount maximizing an expected profit for each seller by executing a process similar to the process executed in the embodiment shown in FIG. 1 through FIG. 6 (S1100). In this computation, it is supposed that there is no limit to a total supplied amount to each seller.

The determining section 1000 determines whether or not the total supplied amount maximizing a value of a potential demand probability function generated for each seller is within the specified range (S1105). On condition that the total supplied amount is outside the specified range (S1105: NO), the changing section 1010 computes an expected profit to be decreased when a supplied amount for each seller is changed, in order to bring the total supplied amount close to the specified range, and then selects a seller who has the smallest expected profit to be decreased (S1110). Thereafter, the changing section 1010 decreases the supplied amount to the selected seller (S1120), and returns the processing to On condition that the total supplied amount has entered into the specified range after the change in the supplied amount by the changing section 1010 (S1105: YES), the output section 1020 outputs a supplied amount including the changed supplied amount to each seller (S1130).

Figure 12:
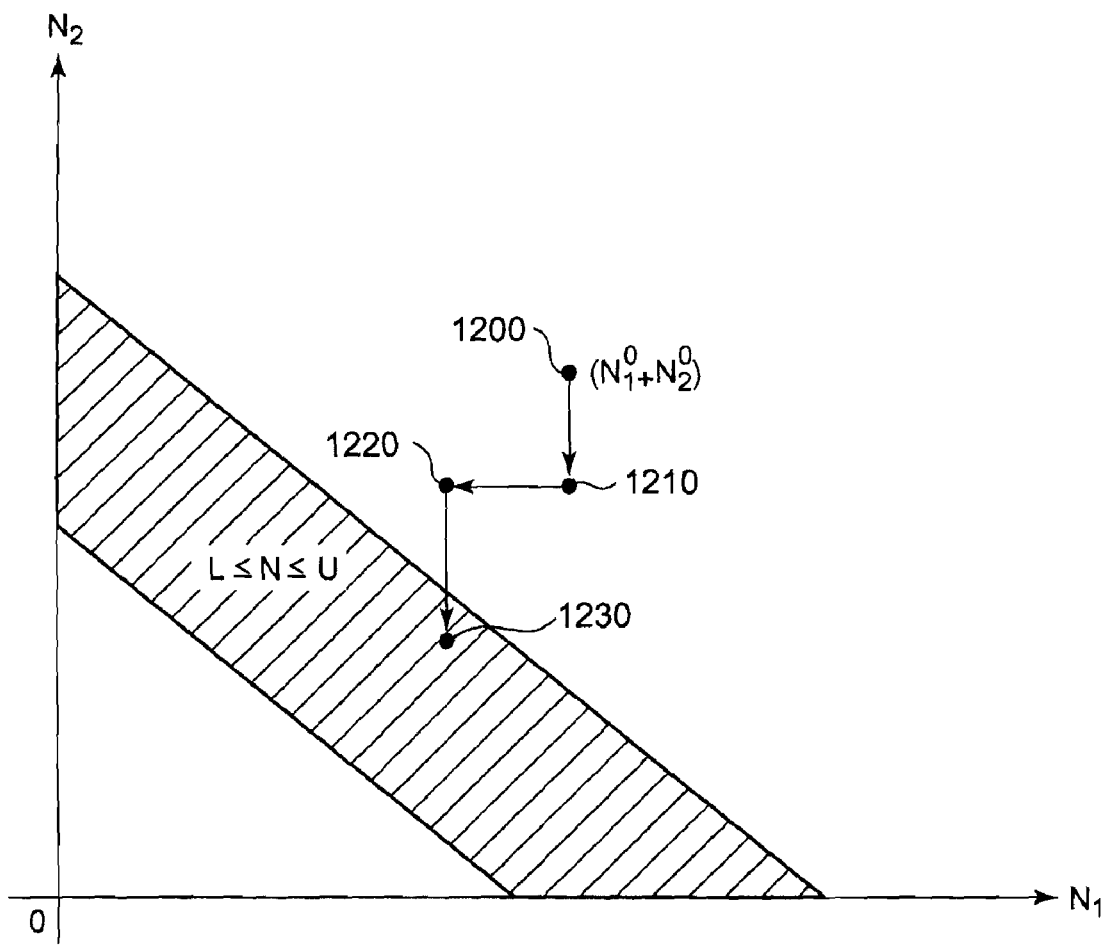
FIG. 12 is a conceptual view of processing for computing a supplied amount for each seller in a third modification example.

FIG. 12 shows a conceptual view of processing for computing a supplied amount for each seller in the third modification example. In this drawing, the horizontal axis represents a supplied amount $N_1$ to a dealer A, and the lateral axis represents a supplied amount $N_2$ to a dealer B. The shaded area represents the range of $N_1$ and $N_2$ where the total supplied amount N is within a range from a lower limit L to an upper limit U. The coordinate value 1200 shows a set of supplied amounts computed in S1100. The changing section 1010 selects the dealer B as a dealer who has the small decrease in an expected profit, and decreases the supplied amount to the dealer B. Sets of supplied amounts computed as a result are shown in the coordinate value 1210.

Since the coordinate value 1210 is not included in the specified range, the changing section 1010 further selects a dealer who has a small decrease in an expected profit. The dealer being selected is termed as a dealer A. The changing section 1010 decreases the supplied amount to the dealer A. Sets of supplied amounts computed as a result are represented in a coordinate value 1220. Since the coordinate value 1220 is not included in the specified range either, the changing section 1010 further selects a dealer who has a small decrease in an expected profit. The dealer being selected is termed as a dealer B. The changing section 1010 further decreases the supplied amount to the dealer B. Sets of supplied amounts computed as a result are represented in a coordinate value 1230. The coordinate value 1230 is included in the specified range.

With the processing described above, the supplied amount computing section 330 can compute sets of supplied amounts that are within the specified range. Moreover, since a function indicating an expected profit for each seller is convex upward, it is possible to compute a supplied amount maximizing an expected profit under the limit of the total supplied amount, by sequentially selecting a seller who has a small decrease width in a profit according to the method described in FIG. 12.

Figure 13:
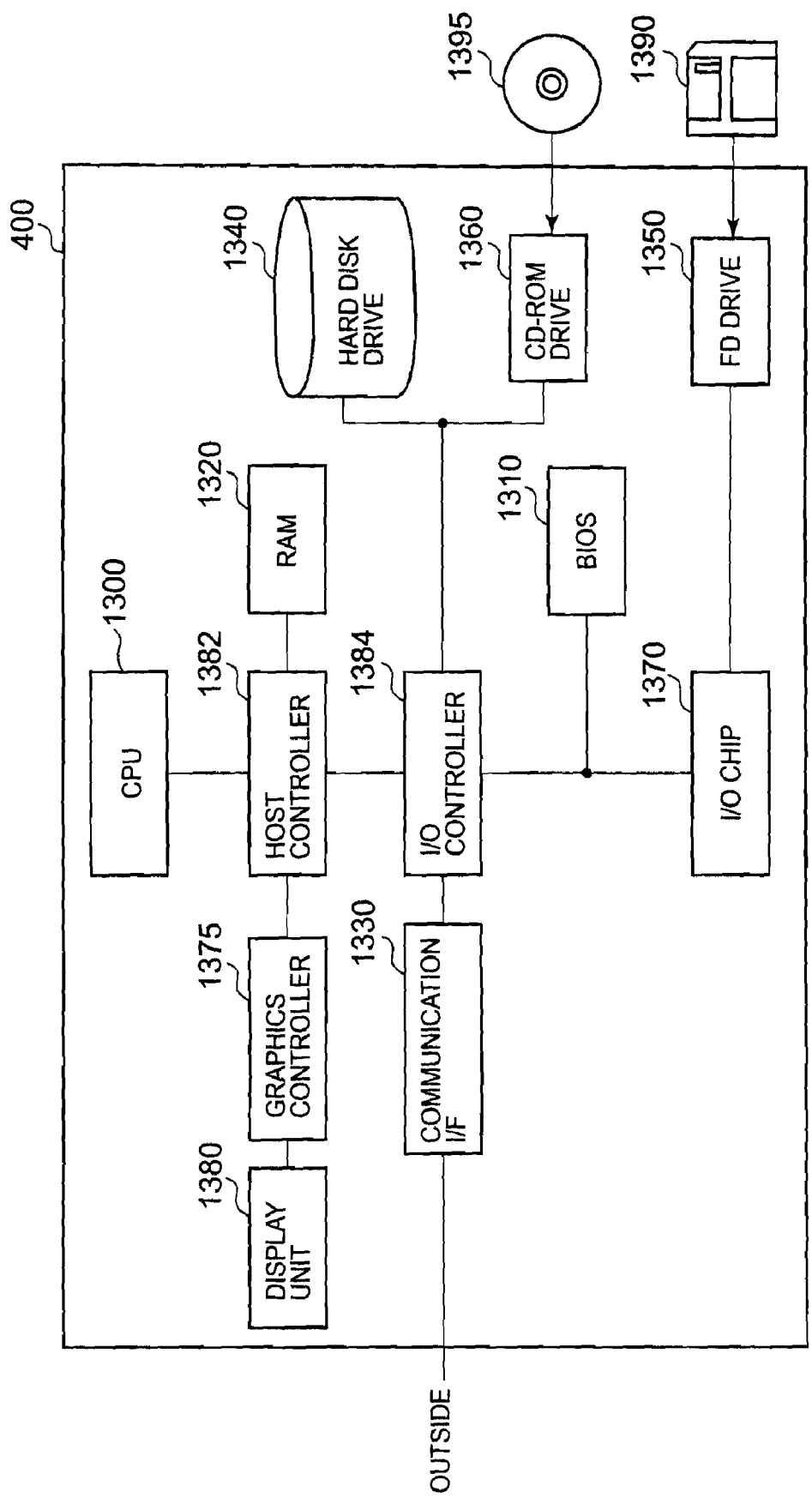
FIG. 13 is a view showing an example of a hardware construction of an information processing apparatus 400 functioning as a main body 30 of the support system 10 in the embodiment or any of the modification examples stated above.

FIG. 13 shows an example of a hardware construction of an information processing apparatus 400 which functions as a main body 30 of the support system 10 in the foregoing embodiment and modification examples. The information processing apparatus 400 includes a CPU peripheral part having a CPU 1300, a RAM 1320, and a graphic controller 1375, which are connected to each other by a host controller 1382, and an input/output part having a communication interface 1330, a hard disk drive 1340, and a CD-ROM drive 136, which are connected to the host controller 1382 by the input/output controller 1384, and a legacy input/output part having a BIOS 1310, a flexible disk drive 1350, and an input/output chip 1370, which are connected to the input/output controller 1384.

The host controller 1382 connects the RAM 1320 to the CPU 1300 accessing the RAM 1320 with a high transmission rate, and the graphic controller 1375. The CPU 1300 operates based on a program stored in the BIOS 1310 and the RAM 1320, and controls the respective parts. The graphic controller 1375 acquires image data generated on a frame buffer that the CPU 1300 or the like provided in the RAM 1320, and displays the data on a display device 1380. Instead of this, the graphic controller 1375 may include a frame buffer for storing image data generated by the CPU 1300 or the like in the apparatus.

The input/output controller 1384 connects the host controller 1382 to the communication interface 1330 that is an input/output device having a relatively high speed, the hard disk drive 1340, and the CD-ROM drive 1360. The communication interface 1330 communicates with external devices through network. The hard disk drive 1340 stores a program and data used by the information processing apparatus 400. The CD-ROM drive 1360 reads a program or data from the CD-ROM 1395 and provides the program or data to the RAM 1320 or the hard disk drive 1340.

Also, input/output devices having relatively slow speeds such as the BIOS 1310, the flexible disk drive 1350, and the input/output chip 1370 are connected to the input/output controller 1384. The BIOS 1310 stores a boot program executed by the CPU 1300 when the information processing apparatus 400 is started, a program depending on the hardware of the information processing apparatus 400, or the like. The flexible disk drive 1350 reads a program or data from a flexible disk 1390 and provides the program or data to the RAM 1320 or the hard disk drive 1340 through the input/output chip 1370. The input/output chip 1370 connects various kinds of input/output devices through the flexible disk 1390 and for example, a parallel port, a serial port, a keyboard port, a mouse port or the like.

Being stored in a storage medium such as the flexible disk 1390, the CD-ROM 1395, an IC card or the like, a program provided to the information processing apparatus 400 is provided by a user. The program is read from a storage medium through the input/output chip 1370 and/or the input/output controller 1384, and is installed in the information processing apparatus 400 to be executed. Since an operation that the program works the information processing apparatus 400 to perform is the same as the operation performed in the main body 30 described in FIG. 1 through FIG. 12, the descriptions thereof will be omitted.

The program described above may also be stored in an external storage medium. As such storage media, it is possible to use the flexible disk 1390 and the CD-ROM 1395 as well as an optical recording medium such as a DVD, a PD or the like, a magneto-optical medium such as a MD, a tape medium, a semiconductor memory such as an IC card, or the like. Moreover, it is permitted to use a storage device such as a hard disk or a RAM provided in a server system connected to a private communication network or the Internet as a storage medium and provide the program to the information processing apparatus 400 via such network.

All the descriptions above are given based on the embodiment of the present invention. However, the scope of the techniques of the present invention is not limited to the descriptions of the embodiment provided above. It is obvious to a person skilled in the art that various changes or modifications can be added to the above embodiment. It is clear from the descriptions of the claims that embodiments to which such changes or modifications are added can be included in the technical scope of the present invention.

The invention claimed is:

1. A system that supports at least one of a purchase and a production of a product, comprising:
an input means for accepting an input of a history of a supplied amount of the product and a history of a sold amount that is a quantity of the product sold from the supplied amount of the product to form an input history;
a function generating means (i) for representing a conditional probability function showing probability distribution of the sold amount when the sold amount is restricted by the supplied amount by means of a potential demand probability function including a parameter showing probability distribution of the sold amount when the sold amount is not restricted by the supplied amount and (ii) for computing a value of the parameter maximizing a value of a likelihood function of the conditional probability function using the input history as a sample, in order to generate the potential demand probability function;
a supplied amount computing means for computing a supplied amount of the product maximizing a profit by a sale of the product, and outputting the computed supplied amount as a quantity of the product to either be purchased or produced, based on the generated potential demand probability function and a predetermined selling price and supplying price of the product; and
a selecting means for selecting a set of a supplied amount and a sold amount in case that the sold amount is less than the supplied amount by at least a difference value M among sets of sold amounts $n_i$ and supplied amounts $m_i$ ($0 \leq i \leq 1$) included in the input history to form a selected history, wherein the function generating means comprises:
means for representing the conditional probability function P' in an equation $$P'(n|m_i|a, b, c, \ldots) = F(n|a, b, c, \ldots) \Bigg/ \sum_{n=0}^{m_i-M} F(n|a, b, c, \ldots)$$

for computing a contingent probability under a condition that a sold amount is less than a supplied amount by at least the difference value M by means of the potential demand probability function F; and
means for computing a value of the parameter maximizing a value of the likelihood function of the conditional probability function P' relative to the selected history.

2. The system according to claim 1, wherein the supplied amount computing means comprises means for computing the supplied amount of the product that maximizes a profit by a sale of the product, including a cost for discarding some of the product in dead stock.

3. The system according to claim 1, wherein the function generating means represents the conditional probability function as an equation using the potential demand probability function, substitutes each probability of generating sold amounts in the history under restriction of a supplied amount in the history for each of the conditional probability functions included in the likelihood function, and replaces each of the probabilities of generating the sold amount in the history under restriction of the supplied amount in the history, which has been substituted for the conditional probability function, by a probability equation using the potential demand probability function in order to numerically compute a value of the parameter maximizing a value of the likelihood function, relative to the substituted supplied amount and sold amount in the history by a computer.

4. The system according to claim 1, wherein the function generating means comprises:
means for representing the conditional probability function, relative to a sold amount and a supplied amount that are metric variables, as a function computing a same probability density as the potential demand probability function in terms of a sold amount less than a supplied amount, and represents as an integration value obtained by integrating the probability density computed by the potential demand probability function in case that a sold amount becomes equal to or more than a supplied amount, in terms of a sold amount equal to a supplied amount; and
means for computing a value of the parameter maximizing a value of the likelihood function of the conditional probability function relative to the inputted history.

5. The system according to claim 1, wherein:
the input means further comprises means for accepting an input of a history of a selling price of the product, in association with the history of the sold amount and a supplied amount;
the function generating means comprises means for representing the conditional probability function depending on a selling price as a potential demand probability function including a parameter depending on a selling price, and means for computing a value of the parameter maximizing a value of the likelihood function of the conditional probability function relative to the history of the sold amount and the supplied amount; and
the supplied amount computing means includes a first computing means for computing a supplied amount of the product maximizing a profit by a sale of the product, based on the generated potential demand probability function as well as a preliminarily given selling price and the supplying price; a second computing means for computing the selling price maximizing a profit by a sale of the product to provide the same to the first computing means, based on the generated potential demand probability function, the supplied amount and the supplying price computed by the first computing means; and an output means for causing the first computing means and the second computing means to alternately compute the selling price and the supplied amount, and under the condition that the selling price and the supplied amount have converged to a predetermined range, outputting the converged selling price and the supplied amount.

6. The system according to claim 1, wherein:
the input means comprises means for accepting, for each of a plurality of sellers, an input of a history of a supplied amount of the product to the seller and a history of a sold amount of the product in the seller;
the function generating means comprises, for each of the plurality of sellers, means for generating the potential demand probability function of the seller as an upward convex function by proposing a maximum likelihood of the parameter relative to the conditional probability function of the seller; and
the supplied amount computing means includes:
a determining means for determining whether or not a total value of the supplied amount maximizing the potential demand probability function generated for each seller is within a specified range predetermined as a range of a value that a total of supplied amounts can take;

a changing means for computing a expected profit being decreased when a supplied amount to each of the sellers is changed in order to bring the total value of the supplied amounts close to the specified range on condition that the total value of the supplied amounts is outside the specific range, and selecting a seller who has the smallest expected profit to be decreased, in order to decrease a supplied amount to the seller; and an output means for causing the changing means to further change a supplied amount on condition that the total value of the supplied amounts is outside the specified range regardless of the decrease in the sold amount by the changing means, and outputting each supplied amount including the changed supplied amount to each of the sellers on condition that the total value of supplied amounts has entered within the specified range by the change of the supplied amount by the changing means.

7. A method that supports accumulation of a product, the method comprising the steps of:

accepting, at an information processing apparatus, an input of a history of a supplied amount of a product and a history of a sold amount that is a quantity of the product sold from the supplied amount of the product to form an input history;

representing a conditional probability function showing probability distribution of the sold amount in case that the sold amount is restricted by the supplied amount by means of a potential demand probability function including a parameter showing probability distribution of the sold amount when the sold amount is not restricted by the supplied amount and computing a value of the parameter maximizing a value of a likelihood function of the conditional probability function using the input history as a sample, in order to generate the potential demand probability function;

computing, by a processor, a supplied amount of the product maximizing a profit by a sale of the product, based on the generated potential demand probability function as well as a predetermined selling price and supplying price of the product, and outputting the computed supplied amount as a quantity of the product to be accumulated; and selecting a set of a supplied amount and a sold amount in case that the sold amount is less than the supplied amount by at least a difference value M among sets of sold amounts $n_i$ and supplied amounts $m_i$ ($0 \leq i \leq 1$) included in the input history to form a selected history, wherein representing a conditional probability function, comprises:

representing the conditional probability function P' in an equation $$P'(n|m_i|a, b, c, \ldots) = F(n \mid a, b, c, \ldots) \bigg/ \sum_{n=0}^{m_i-M} F(n \mid a, b, c, \ldots)$$

for computing a contingent probability under a condition that a sold amount is less than a supplied amount by at least the difference value M by means of the potential demand probability function F; and computing, by a processor, a value of the parameter maximizing a value of the likelihood function of the conditional probability function P' relative to the selected history.

8. A program product stored in a non-transitory storage medium that causes an information processing apparatus to function as a system supporting an accumulation of a product, the program product causing the information processing apparatus to function as:

an input means for accepting an input of a history of a supplied amount of the product and a history of a sold amount that is a quantity of the product sold from the supplied amount of the product to form an input history;

a function generating means (i) for representing a conditional probability function showing probability distribution of a sold amount in case that the sold amount is restricted by the supplied amount by means of a potential demand probability function including a parameter showing probability distribution of the sold amount when the sold amount is not restricted by the supplied amount and (ii) computing a value of the parameter maximizing a value of a likelihood function of the conditional probability function using the input history as a sample in order to generate the potential demand probability function;

a supplied amount computing means for computing a supplied amount of the product maximizing a profit by a sale of the product, based on the generated potential demand probability function as well as predetermined selling price and supplying price of the product, and outputting the computed supplied amount as a quantity of the product to be accumulated; and a selecting means for selecting a set of a supplied amount and a sold amount in case that the sold amount is less than the supplied amount by at least a difference value M among sets of sold amounts $n_i$ and supplied amounts $m_i$ ($0 \leq i \leq 1$) included in the input history to form a selected history, wherein the function generating means:

represents the conditional probability function P' in an equation $$P'(n|m_i|a, b, c, \ldots) = F(n \mid a, b, c, \ldots) \bigg/ \sum_{n=0}^{m_i-M} F(n \mid a, b, c, \ldots)$$

for computing a contingent probability under a condition that a sold amount is less than a supplied amount by at least the difference value M by means of the potential demand probability function F; and computes a value of the parameter maximizing a value of the likelihood function of the conditional probability function P' relative to the selected history.

9. A method for providing a service that supports accumulating a product, the method comprising the steps of:

accepting, at an information processing apparatus, a supplied history of a supplied amount of the product and a sold history of a sold amount that is a quantity of the product sold from the supplied amount of the product, and inputting the supplied history and the sold history into a system to form an input history;

representing a conditional probability function showing probability distribution of the sold amount in case that the sold amount is restricted by the supplied amount by means of a potential demand probability function including a parameter showing probability distribution of the sold amount when the sold amount is not restricted by the supplied amount and computing a value of the parameter maximizing a value of a likelihood function of the conditional probability function using the input history as a sample in order to generate the potential demand probability function;

computing, by a processor, a supplied amount of the product maximizing a profit by a sale of the product, based on the generated potential demand probability function as well as a predetermined selling price and supplying price of the product, and causing the system to output the computed supplied amount as a quantity of the product to be accumulated; and selecting a set of a supplied amount and a sold amount in case that the sold amount is less than the supplied amount by at least a difference value M among sets of sold amounts $n_i$ and supplied amounts $m_i$ ($0 \leq i \leq 1$) included in the input history to form a selected history, wherein representing a conditional probability function, comprises:

representing the conditional probability function P' in an equation $$P'(n|m_i|a, b, c, \ldots) = F(n | a, b, c, \ldots) \bigg/ \sum_{n=0}^{m_i - M} F(n | a, b, c, \ldots)$$

for computing a contingent probability under a condition that a sold amount is less than a supplied amount by at least the difference value M by means of the potential demand probability function F; and computing, by a processor, a value of the parameter maximizing a value of the likelihood function of the conditional probability function P' relative to the selected history.

\* \* \* \* \*